United States Patent [19]

Klaff

[11] Patent Number: 4,608,298
[45] Date of Patent: Aug. 26, 1986

[54] WEATHER PROOF INSULATING TEXTILE FABRIC COMPOSITE

[75] Inventor: Harry J. Klaff, Owings Mills, Md.

[73] Assignee: Rockland Industries, Baltimore, Md.

[21] Appl. No.: 772,849

[22] Filed: Sep. 5, 1985

[51] Int. Cl.$^4$ .............................................. B32B 7/00
[52] U.S. Cl. ................................. 428/246; 428/102; 428/284; 428/316.6
[58] Field of Search ...................... 160/84 R, DIG. 7; 428/102, 246, 284, 316.6

[56] References Cited

U.S. PATENT DOCUMENTS

| | | | |
|---|---|---|---|
| 4,397,346 | 8/1983 | Chumbley et al. | 160/84 R |
| 4,495,661 | 1/1985 | Kamat | 428/316.6 |

FOREIGN PATENT DOCUMENTS

| | | | |
|---|---|---|---|
| 660081 | 7/1963 | Canada | 428/246 |
| 1091137 | 11/1967 | United Kingdom | 428/316.6 |
| 1431263 | 4/1976 | United Kingdom | 428/246 |

Primary Examiner—William J. Van Balen
Attorney, Agent, or Firm—Murray and Whisenhunt

[57] ABSTRACT

A weather resistant, vertically foldable, insulating, multi-layered textile composite is provided having a first outer layer composed of a knitted textile fabric with tightly interlaced synthetic textile yarns, which layer has water repellency properties. A second layer next to the first layer is composed of a tightly woven textile fabric having a flexible, polymeric essentially closed cell foam coating attached thereto. A third layer next to the second layer is composed of a non-woven batt of insulating textile fibers. A fourth layer next to the third layer is composed of an impervious synthetic polymeric film. A fifth layer next to the fourth layer is composed of a non-woven batt of chemical resistant textile fibers. A sixth inside layer next to the fifth layer is composed of a knitted textile fabric having tightly interlaced synthetic textile yarns, which layer has water repellency properties. The said layers are stitched together by rows of stitches of synthetic textile yarns, which rows of stitches are at least horizontally disposed such that the composite is vertically foldable. The composite has an insulating R value of at least 3 at a total composite thickness of at least less than 0.50 inch.

32 Claims, 1 Drawing Figure

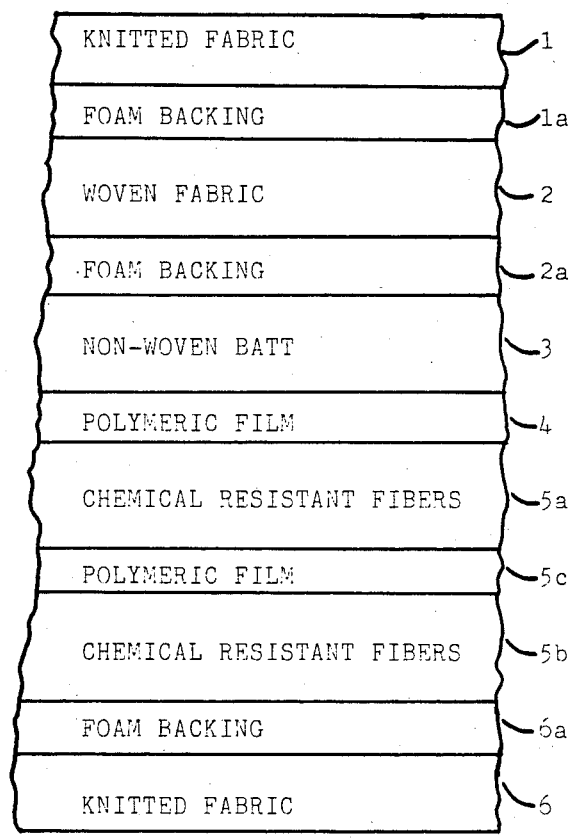

WEATHER PROOF INSULATING TEXTILE FABRIC COMPOSITE

The present invention relates to a weather resistant, vertically foldable, insulating, multi-layered textile fabric composite, and more particularly to such a composite useful in providing insulation to building openings which are normally unprotected from the weather. The invention has particular applicability to protecting window openings in conventional animal holding pins, which windows do not normally contain glass or any other weather protecting barrier.

BACKGROUND OF THE INVENTION

Insulating textile fabric composites are well known to the art and are composed, generally, of combinations of textile fabrics, insulating battings, and, often, impervious vapor barrier films, which films may be optionally metalized, e.g., with vapor deposition of aluminum, to provide a reflecting surface. Such insulating composites are designed for use in the interior of the building and are usually disposed next to a pane of glass. With proper disposition of such composites, the heat transfer through such a glass paned window can be significantly reduced and thereby provide a reduced energy consumption of the building, both in the winter from heat loss and in the summer from heat gain through the glass paned windows.

A typical example of such a composite is disclosed in U.S. Pat. No. 4,397,346, the disclosure of which patent is incorporated herein by reference. In that patent, there is disclosed an insulating fabric composite useful for deployment next to a glass paned window (on the inside of that window) which can provide a R value of nearly 3, depending upon the choices of fabrics, batts and films. That composite is composed of multiple layers. A typical embodiment has a first layer (next to the glass paned window) that is a light and mildew resistant fabric, optionally foam backed. The second layer is a lightweight needled insulating batt. The third layer is a vapor barrier composed of a polymeric film, optionally metalized. The fourth layer is a needle punched dead air trapping layer of textile fibes, optionally including a metalized polymeric film within the needle punched layer and a fifth optional layer is a decorative cover fabric. It will be appreciated that with this combination, the first layer provides resistant to light and mildew to the composite, so as to protect the composite therefrom. The second layer, being a needled fiber batt, provides the essential insulating layer, and the polymeric film next thereto provides a vapor barrier to reduce transfer of vapor through the composite, and especially into the insulating batt. The aluminized surface or surfaces of the polymeric film provides a reflective surface or surfaces for reflecting light passing through the composite, and, hence, increases the overall resistance to heat transfer. Finally, the fourth layer is for additional insulation.

While composites of the foregoing nature have provided substantial window insulation for home and building use, these composites are designed for, and can only be used for, deployment next to the inside surface of the glass pane of a window or of a building wall. These composites do not provide any resistance to ambient weather, and, hence, would quickly lose their insulating value if subjected to ordinary weather, e.g., especially rain, sleet and the like.

Some efforts have been made to provide window covers for animal holding pins, e.g., plastic films and plastic coated fabrics. These pins are normally constructed with a substantial number of open windows, which windows are normally constructed with only screening for insect exclusion. Such large numbers of open windows are necessary, since the body heat of the animals during the summer period would raise the temperature of the pins to unacceptably high levels without substantial ventilation through the opened windows. Such window coverings have also been made of wood (or other material), usually in the form of shutters, but this expedient is not really satisfactory, since those shutters severely restrict sunlight and are not normally constructed with the accuracy required to eliminate substantial air leakage.

Efforts have also been made to use conventional textile composites, e.g., combinations of fabrics and insulating batts for insulating the window openings of such animal pins. However, it has been found that such composites lose substantial amounts of the insulating value when exposed to wet conditions, e.g., rain, snow and ice. Therefore, those conventional composites, have not proved to be satisfactory in use.

It should be appreciated, however, that there is a considerable economic incentive for providing adequate insulating covers for such animal pin windows, since the temperature within the animal pin is quite critical. For example, if the temperature in a conventional hog holding pin drops below about 55 degrees Fahrenheit, the food consumption of the hogs goes mainly for maintaining body heat and the hogs experience very little weight gain. On the other hand, if the temperature in a hog holding pin exceeds about 80 to 85 degree Fahrenheit, hogs experience low weight gains. As another example, in chicken holding pins, if the temperature drops below about 80 degrees Fahrenheit, again, a significant portion of the food consumed by the chickens is used in maintaining body heat and the weight gain of the chickens decreases. Animal husbanders refer to this phenomenon as the feed-to-weight ratio and for economic reasons, the feed-to-weight ratio should be as low as possible, since a major cost in producing the animals is the cost of the feed consumed by the animals.

The temperature in such pins may be maintained by fueled heating means, such as gas-fired forced air heaters, as opposed to the temperature being maintained by the body heat of the animals, but the cost of the fuel for such heaters is a direct cost in the animal production, much as the cost of the feed. Therefore, animal husbanders attempt to use as little fuel in maintaining the pin temperatures as possible and rely on the body heat of the animals to the extent possible.

For the foregoing reasons, it is important for these opened windows to be insulated in the winter, for conserving the body heat of the animals and any fueled heat added to the pins, but yet be capable of being fully opened in the summer to maintain maximum air flow through the pins for cooling and ventilation purposes.

OBJECTS OF THE INVENTION

It is therefore an object of the invention to provide a weather resistant insulating textile composite which can be deployed next to opened windows of an animal holding pin to provide good insulation and maintain that insulation in all weather conditions. It is a further object of the invention to provide such textile composites which can be used in other weather encountering environments while still maintaining a good insulating value. It is a further object of the invention to provide a composite that may be easily deployed next to such opened windows and yet be easily redeployed away from such opened windows for maximum ventilation through those opened windows in the summer period, which will allow economic use of the composites during the winter but not impede ventilation during the summer. Other objects will be apparent from the following description and claims.

BRIEF DESCRIPTION OF THE DRAWINGS

The FIGURE is a cross-sectioned view, in schematic form, showing a preferred embodiment of the present composite.

BRIEF DESCRIPTION OF THE INVENTION

The invention is based on four primary discoveries and several subsidiary discoveries.

First of all, and as a major feature of the invention, it was discovered that conventional composites, as described above, could be surprisingly protected from weather, especially rain, if those fabrics were provided with an outer layer of tightly interlaced synthetic yarns which provide to the layer a water repellency property. Fabrics of that nature, surprisingly, have the ability to shed substantial amounts of water, and prevent that water from being absorbed into the composite, As a subsidiary, but very important, discovery, it was found that when this first outer layer is a knitted fabric, as opposed to a woven fabric, then the water shedding properties are substantially increased on comparable weights of knitted and woven fabrics.

A second discovery is that when the composite is provided with a second layer (next to the outer layer) of a tightly woven fabric, substantial additional water repellance to the interior of the composite is provided. While this tightly woven fabric is not of absolute criticality for some limited application of the present composite, as explained in detail below, it is greatly preferred for all applications and critical for some applications of the composite. This layer co-functions with the first layer to give a surprising water repellancy to the composite. The tightly woven fabric, next to the outer layer, while functioning to intercept any water passing through the outer layer, also, most importantly, functions as a major strength and dimensional retaining layer, as more fully explained below. However, since these composites must protect again not only water, but wind associated therewith, this tightly woven fabric preferably is backed by a substantially closed cell foam coating which will act as a substantial windbreak and prevent the wind from driving water, passing through the outer layer, through the tightly woven fabric.

A third discovery is that when the composite is intended for use in animal holding pins, a substantial advantage is achieved when the composite has a layer near the side thereof next to the animal pin which is a chemical resistant layer, as more fully discusssed below. It was discovered that in many animal pins, especially swine pins, the atmosphere is often contaminated with nitrogenous gases produced from the urine of the animals and those nitrogenous gases will penetrate the interior side of the composite and cause deterioration of ordinary fibers within the composite. By providing a chemical resistant layer close to the side of the composite next to the animal pin, it was discovered that these nitrogeous vapors are normally condensed in that layer and are prevented from transferring through the remainder of the composite. In this regard, it was found that a non-woven batt of chemical resistant fibers better performed the function of the chemical resistant layer. As a further subsidiary discovery, it was found that this layer should be most open in construction and to provide strength to that layer a scrim is preferably incorporated therein. The scrim, preferably is a thin film of chemical resistant polymer, and preferably a perforated film, which film may, optionally, be metalized.

This chemical resistant layer is not critical for all applications of the present composite, but is greatly preferred. In some limited applications, as explained below, this chemical resistant layer can be eliminated, although it is greatly preferred for all applications of the present composite.

Finally, as a basic discovery, it was found that since these pins are often hosed with water for cleaning purposes, the inner-most layer of the composite must be a layer which has water-repellency properties. Preferably the water repellent layer is essentially the same as the outer layer of the composite. This lyaer avoids inadvertent water splashing from the inside of the pin penetrating the composite and decreasing the insulating value thereof. In this regard, however, there is no need for the combination of a water repellent layer and a tightly woven fabric (optionally with a closed foam coating thereon) as is needed with the outside surface of the composite, since there is no wind factor from within the holding pins.

Accordingly, there is provided a weather resistant, vertically foldable, insulating, multi-layered textile fabric composite. That composite comprises a first outer layer composed of a knitted textile fabric having tightly interlaced synthetic textile yarns, which layer has water-repellency properties. Most preferably, a second inter-layer is provided, next to said first outer layer, and is composed of a tightly woven textile fabric perferably having a flexible polymeric essentially closed cell foam coating on the inside surface thereof, which coating provides a windbreak. A third inter-layer, next to said second layer, is composed of a non-woven batt of insulating textile fibers. A fourth inter-layer, next to said third layer, is composed of an impervious synthetic polymeric film (optionally metalized), which functions in its conventional manner as a vapor barrier. Most preferably, a fifth inter-layer, next to said fourth layer, is composed of a non-woven batt of chemical resistant textile fibers, and that batt, preferably, is in combination with a scrim, e.g., thin, preferably perforated, film of a chemical resistant polymeric material (optionally metalized). A sixth inside layer, next to said fifth layer, is a water repellent layer and preferably is composed of a knitted textile fabric having tightly inter-laced synthetic textile yarns, which layer, also, may have a foam backing.

The layers are stitched together by rows of stitches of synthetic textile yarns, which rows of stitches are at least horizontally disposed such that the composite is vertically foldable. By these means, the composite has an insulating R value of at least 3.3, at a total composite thickness of less than 0.5 inch.

DETAILED DESCRIPTION OF THE INVENTION

With reference to the drawing, which shows a preferred embodiment of the invention, the side of the composite intended to face the weather is the side of first outer layer 1. That layer is composed of a knitted textile fabric having tightly inter-laced synthetic textile yarns, which layer 1, by virtue of the tightly knitted construction and the surface tension (wetting) properties of the yarns, has a water-repellency property. Preferably, the knit is a warp knit, and the fibers of the yarns are essentially water impervious substantially non-wetting, synthetic fibers such as nylon, vinyl, rayon, polyester or polyolefin textile yarns. The knit should be tight enough so that the inter-laced yarns of the knit provide essentially no straight line openings through the knitted layer, in order to provide water-repellency properties and to substantially prevent wind blown rain from being driven through the knitted fabric. With such a knitted outer layer, most of the water contacting that outer layer, whether windblown or not, will not penetrate that outer layer but will be shed therefrom and allowed to run vertically downwardly of that outer layer of the composite.

Optionally, but preferably, the first layer 1 may have a flexible coating of essentially closed cell compressed polymeric foam (backing) 1a on the interior side thereof. Such a backing of closed cell foam, also, acts as a windbreak and restricts the amount of water that can be blown through the outer knitted fabric 1. However, such a foam backing is not required, especially when the knitted outer layer 1 is tightly knitted, e.g., has a weight of between about 2 and 6 ounces per square yard. Nevertheless, if desired such a foam backing can be placed on outer layer 1 and the conventional compressed acrylic, vinyl, etc. latex foam backings are quite satisfactory therefor.

To further improve water repellency, the outer and/or inner surface of layer 1 may be treated with a water repellent material, such as a silicone, urethane, or fluorocarbon, which are convention water repellency treatments. However, some water, especially under high wind conditions, may possibly pass through outer layer 1, and even through foam backing 1a, when used, primarily by absorption. Such water will, nevertheless, encounter a second layer 2, which is next to the first outer layer, and is composed of a tightly woven textile fabric, preferably with a flexible compressed polymeric essentially closed cell foam coating (backing) 2a attached thereto, which backing may be the same as backing 1a. This second layer actually provides two functions. First, as noted above, it is a barrier to transfer of water which has passed through the first layer (optionally with the foam backing thereon). In addition, and most importantly, this layer, being a tightly woven fabric, provides the major strength and shape retention properties of the composite. As will be appreciated from the following description, these composites will normally be deployed next to a window and redeployed away from the window for ventilation, many times. It is therefore essential that the fabric have an overall acceptable level of strength and shape retention. It is this second layer 2, of the tightly woven textile fabric, which provides the major amounts of the strength and most of the shape retaining properties, as opposed to the relatively low abilities of a knitted fabric or batts of fibers or a polymeric film.

Any water actually encountered by the interior of the composite is mainly contained between the juncture of knitted fabric 1 and woven fabric 2, although most of the water encountered by the composite will have been shed by knitted fabric 1. Nevertheless, air circulation at that junction between layers 1 and 2 is considerable and the water contained at that junction can be relatively rapidly evaporated by ambient air. This is a self-drying feature of the composite, and greatly improves the ability of the composite to maintain its insulating value even in heavy weathering conditions.

A third inter-layer 3, next to the said second layer 2, is composed of a non-woven batt of insulating textile fibers. This non-woven batt 3 provides substantial amounts of the insulating value of the composite. Conventional insulating batts may be used in this regard, e.g., polyesters, vinyls, polyolefins, rayons and nylon or even glass fibers, and the batts may be simply laid batts or laid and needled batts. However, these batts should have an R value of at least about 2, and more preferably at least about 2.2 and ideally about 2.5 or more.

A fourth inter-layer 4, next to the said third layer, is composed of an impervious synthetic polymeric film, e.g., a polyolefin (polypropylene or polyethlene) film, a nylon film, a vinyl film, or the like. This fourth layer 4 provides a vapor barrier to the composite and essentially prevents vapor from the higher humidity air within the pin from penetrating and condensing in the non-woven insulating batt 3, since condensation in batt 3 would substantially reduce the R value thereof. This is a conventional use of a vapor barrier film. Also, as is conventionally practiced, that film of layer 4 may have one or both surfaces metalized, particularly with a light reflecting metal, such as aluminum, in order to act as a reflecting surface. Here again, this is a conventional metalized film for reflecting purposes.

A fifth inter-layer 5a and 5b, next to fourth layer 4, is composed of a non-woven batt of chemical resistant textile fibers. As shown in the drawing, fifth inter-layer 5a and 5b preferably has disposed therein a scrim, e.g., a polymeric film, 5c. While the use of such a scrim 5c is optional, it is most preferable, especially when the non-woven batt of chemical resistant fibers is thin, for the reasons explained below, and such scrim will provide strength and stability to that thin non-woven batt of chemical resistant fibers. If such a scrim is used, it is preferred that it be disposed in the interior of the batt of chemical resistant fibers, as shown in the drawing, although it could be disposed on either side thereof.

The chemical resistant fibers are normally synthetic polymeric fibers, and must be resistant to nitrogeous vapors produced from animal urine, when those vapors are condensed therein. These vapors and the chemical properties thereof are well-known to the art, and any of the synthetic polymeric fibers known to be resistant thereto, e.g., a high density olefins, polyesters, fluorocarbons, etc., may be used in this layer. However, Mylar fibers have been found to be particularly useful and these fibers are preferred.

As noted above, this fifth layer 5a and 5b may be relatively thin, e.g., 1½ to 4 ounces per square yard, although weights up to 6 ounces per square yard may be used, and may be simply a laid non-woven batt or a laid and needled non-woven batt. It is only necessary that this layer 5a and 5b provides substantial surface area for condensation of those nitrogeous vapors. In this regard, it will be appreciated that the moisture barrier layer 4 will prevent the nitrogeous vapors from passing from the interior of the composite to the outer surface of the composite, and those vapors will be essentially stopped at vapor barrier layer 4. Also, since the temperature gradient, in the winter, will be from the outer colder layer 1, those vapors will condense on the interior side of vapor barrier layer 4. By providing the batt of chemical resistant fibers, such condensation can be accommodated on the great surface area of such fibers and will not be allowed to harm other portions of the composite. In addition, with temperature fluctuations in the holding pin, these nitrogeous vapors, which have condensed, will revaporize, and be displaced out of the pin through natural ventilation.

To improve on this condensation and revaporization, the batt of chemical resistant fibers should be an open batt so that vapors may freely circulate therethought. Open batts of this nature have little strength and shape retaining properties. Hence, it is preferred that this batt be carried on a scrim to provide strength and shape retaining properties. While the scrim may be a conventional woven or spun bonded scrim, the scrim is preferable a polymeric film, optionally metalized, since such scrims provide superior strength and shape retention properties. While the scrim may be disposed anywhere in or on the batt, it is preferred that it be disposed inside the batt, since better properties are provided, and two thin batts may be simply adhered to each side of the scrim. In this case, when the scrim is a film, it should be perforated to allow movement of vapors thought the batt.

When the scrim is a perforated film, and disposed centerally in the batt of chemical resistant fibers, the amount of nitrogeneous vapor which will pass through the film will be reduce, even though the film is perforated. Accordingly, the concentration of nitrogenous vapor in the batt of chemically resistent fibers will be considerable less on the interior side of the perforated film scrim (the side toward layer 1), as opposed to the concentration on the exterior side (the side toward layer 6). With this reduced concentration of nitrogeneous vapors, the chemical resistance of the fibers on the interior side need not be an great as the resistance on the exterior side. According, the fibers of layers 5a could be more conventional fibers such as polyester and nylon fibers, while the fibers of layer 5b would be the more chemically resistant fiber such as the glass fibers or Mylar fibers. This will reduce the cost of the composite.

A sixth inside layer 6 is similar to, or the same as, layer 1, and is preferably constructed of a knitted textile fabric having tightly inter-laced synthetic textile yarns, which layer has water-repellency properties, although a woven fabric may be used. The purpose of this layer, as explained briefly above, is to avoid wetting of the composite by water splashed thereon during cleaning operations in the pin. However, also, as briefly explained above, since such splashed water will not be driven by wind (being on the inside of the building), there is no advantage in providing a foam backing thereto, as is the case with the knitted fabric constituting layer 1, and as explained above. However, for convenience of manufacturer, since layers 1 and 6 may otherwise be identical, and when a foam backing is used on layer 1, it is convenient to use a single foam backed knitted fabric for both layers 1 and 6. Thus, for that sake of convenience in manufacture, inside layer 6 may have a foam backing 6a thereon, the same as the foam backing 1a, discussed above.

All of the above described necessary layers, and the optional layers, are stitched together by rows of stitches, which stitches are composed of synthetic textile yarns, e.g., polyester, polyolefin and nylon yarns. These rows of stitches are at least horizontally disposed such that the composite is vertically foldable. It will be appreciated that with the rows of stitches running in the horizontal direction, the composite may be folded at these rows of stitches to vertically gather the composite for moving that composite to the top or bottom of the window and thus provide maximum ventilation in the summer. Alternatively, during warmer winter days, the horizontally disposed stitches will allow partial redeployment of the composite from the window to provide a limited amount of ventilation.

A composite, as described above, with the necessary layers, will have an insulating R value of at least 3.3 at a total composite thickness of at least less than 0.5 inch. It will be appreciated that this R value, on a thickness basis of 0.5 inch or less, is a high R value. This R value can also be substantially maintained, e.g., 80% thereof, even under severe weather conditions, e.g., driving rain. When at least the optional features of the foamed backings are included, an R value of at least 3.5 may be obtained. When all of the optional features, including the foamed backings and the scrim of a thin film disposed in the non-woven chemical resistant batt, as explained above, are included in the composite, an R value of at least 3.7 may be obtained, and even under severe weather conditions at least 80% of the R value can be maintained.

Some additional increase in R value can be obtained by the particular stitching, as discussed above. This provides somewhat of a "quilting" effect. Thus, the stitches are least in parallel rows of stitches where the distant between the rows of stitches is between 2 and 12 inches, but it is preferred that the distance between rows of stitches be between 4 and 8 inches. In addition, further quilting of the essential insulating portions of the composite will provide some additional insulating "quilting" effect. Thus, since layers 2/2a, 3, 4, 5a and 5b, optionally with 5c, provide most of the insulating value (with layers 1 and 6 being essentially the protective layers) those layers may be separately quilted before being stitched into the composite, as explained above.

For the same weight composite, additional insulating value can be obtained by the choice of the fibers constituting the third layer. In recent years, improved insulating fibers have been produced and are referred to in the art as hollow fibers. These fibers are made of various synthetic polymers, but the polyester polymers are preferred for producing such fibers. Therefore, as an optional feature, the third layer is composed of hollow fibers.

From the foregoing, it will also be appreciated that various R values may be obtained by use of various weights of fabrics, batts and films. However, it will also be appreciated that for purposes of animal holding pins, for the reasons explained above, the overall composite must be vertically foldable. That restriction also restricts the total thickness of the composite, since if the composite becomes too thick, it becomes difficult, if at all impossible, to effectively vertically fold. Therefore, the composite should be less than 0.5 inch, and preferably about 0.35 inch or less in overall thickness, and this limitation also limits the thicknesses of the individual fabrics, batts and films. It has been found, in this regard, that there are certain preferred weights for the individual fabrics, films and batts. with the purpose of providing maximum insulating and utility, while maintaining a thickness less than 0.5 inch, e.g., about 0.35 inch. Thus, it is preferred that the outer and inner layers, i.e., the first outer layer 1 and the sixth inside layer 6 be of a warps knitted textile with from at least 2 ounces to no more than 7 ounces per square yard, and preferably between about 2 and 5 ounces per square yard. The second inner layer 2 of the tightly woven textile fabric should have a weight of between about 2 ounces per square yard and 6 ounces per square yard. This can vary with the particular material, and the strength and shape retaining properties provided thereby. However, if that layer is composed of a conventional blend of polyester and cotton, e.g., a 20 to 70 percent cotton, that fabric can provide exceptional strength and shape retention properties at very light weights. With such a fabric, weights as little as 2 to 4 ounces per square yard are quite adequate. The foam backings, 1a, 2a and 6a if used, can be exceedingly thin, e.g., from 0.5 to 4 mils, which is conventional in the art. The non-woven batt of insulating material, layer 3, can also be quite thin, although its thickness will depend upon whether or not it has been simply laid or laid and needled. Nevertheless, batt weights of 1 to 7 ounces per square yard are acceptable, but usually that weight will be within 1 to 4 ounces per square yard. The fourth inner layer 4 of the impervious film as well as the film which may be optionally disposed in the fifth inner layer 5a and 5b of the chemical resistant fibers as a scrim can be quite thin, e.g., from ½ to 4 mils, although films much toward the lower end of that range are preferred, e.g., 1 to 3 mils The fifth layers 5a and 5b of the chemical resistant fibers can vary in its weight depending upon the particular holding pin installation and the expected amount of nitrogeous vapors to be encountered. This layer also provides some insulating value, particularly at higher weights. However, generally speaking this can be a relatively light weight batt, e.g., 1.5 ounce to 6 ounces per square yard.

It will also be appreciated from the above, that substantial variations of the layers can be provided while maintaining the same properties of the overall composite. It is intended that these obvious variations be embraced by the spirit and scope of the annexed claims. The invention will now be illustrated by the following example, although it is to be understood that the invention is not limited thereto, but extends to the scope of the following claims.

EXAMPLE

A first inner composite was formed by assembly of four layers consisting of: 40% cotton 60% polyester woven fabric having a compressed acrylic form backing (3 oz./sq. yard); polyester hollow fiber batt (2.5 ox./sq. yard); polyethylene film, metalized on one side with aluminum (2 mils thickness); and Mylar fiber batt carried on a perforated, aluminum metalized polyethylene film scrim disposed centrally in the batt 2½ oz./sq. yard). The assembly was stitched together with polyester yarns on a single headed sewing machine to produce parallel rows of stitches extending horizonally and spaced 4 inches apart.

On each side of the so-produced inner composite was laid a warp knitted polyester fabric with a compressed acrylic foam backing (4 oz./sq. yard). This second assembly was stitched together in the same manner as above, with the rows of stitches being 4 inches apart.

The R value of the composite was tested in accordance with the procedure of ASTM-C-236 and was determined to be 3.70.

The composite was placed in the openings of windows in a swine holding pin and functioned without difficulties as a window insulator. The pin could also be hosed with water for cleaning, and the composite was not significally wetted, nor did driving rain significantly wet the composite.

The foregoing example shows the utility of the present composites. It is noted that in the disposition of the layer of the composite corresponding to layer 1 of the drawing was toward the open windows and layer 1 corresponding to layer 6 of the drawings was toward the pins. This positioning of the composite cannot be reversed, since the surprising effective combination of the knitted outer layer and woven second layer must be toward the weather. Further, this position is critical, since the chemical resistant layer must be not only protected from the weather but must be on the pin side of the vapor barrier film.

What is claimed is:

1. A weather and chemical resistant, vertically foldable, shape sustaining, insulating, multi-layered textile fabric composite comprising:
   (1) a first outer layer composed of a knitted textile fabric having tightly interlaced synthetic textile yarns, which layer has water repellency properties;
   (2) a second inter-layer next to said first outer layer composed of a tightly woven textile fabric and having a flexible, polymeric essentially closed cell foam coating attached to said second layer;
   (3) a third inter-layer next to said second layer composed of a non-woven batt of insulating textile fibers;
   (4) a fourth inter-layer next to said third layer composed of an impervious synthetic polymeric film;
   (5) a fifth inter-layer next to said fourth layer composed of a non-woven batt of chemical resistant textile fibers;
   (6) a sixth inside layer next to said fifth layer composed of a textile fabric, which layer has water repellency properties;
   said layers being stitched together by rows of stitches of synthetic textile yarns, which rows of stitches are at least horizontally disposed such that said composite is vertically foldable; and
   wherein said composite has an insulating R value of at least 3.3 at a total composite thickness of at least less than 0.50 inch.

2. The composite of claim 1 wherein said first layer is a warp knitted fabric.

3. The composite of claim 2 wherein the yarns of the knitted fabric are polyester yarns.

4. The composite of claim 1 wherein said sixth layer is a warp knitted fabric.

5. The composite of claim 4 wherein the yarns of the knitted fabric are polyester yarns.

6. The composite of claim 1 wherein the said foam coating on said second layer is a compressed acrylic latex foam.

7. The composite of claim 6 wherein the said fabric of said second layer is composed of mixtures of cotton and polyester yarns.

8. The composite of claim 1 wherein said third layer is composed of hollow polyester fibers.

9. The composite of claim 1 wherein the fourth layer is a polyethylene, polypropylene, polyester or nylon film.

10. The composite of claim 1 wherein the said film of said fourth layer is metalized on at least one surface thereof.

11. The composite of claim 1 wherein said fifth layer is resistant to nitrogenous atmospheric condensates.

12. The composite of claim 11 wherein the fibers of said fifth layer are polyester fibers.

13. The composite of claim 1 wherein the fifth layer is a batt having a strength providing scrim disposed therein.

14. The composite of claim 1 where said stitches are at least in parallel rows of stitches where the distance between said rows is between 2 and 12 inches.

15. The composite of claim 14 wherein the said distance between rows of stitches is between 4 and 8 inches.

16. The composite of claim 1 wherein the R value is at least 3.5.

17. The composite of claim 16 wherein the R value is at least 3.7.

18. The composite of claim 13 wherein said scrim of said fifth layer is a perforated polymeric film.

19. The composite of claim 18 wherein the said film disposed in the said fifth layer is metalized on at least one surface thereof.

20. The composite of claim 1 wherein the second, third, fourth and fifth layers are separately stitched together by at least horizontal rows of stitches.

21. A weather resistant, vertically foldable, insulating, multi-layered textile fabric composite comprising:
   (1) a first outer layer composed of a knitted textile fabric having tightly interlaced synthetic textile yarns, which layer has water repellency properties;
   (2) a second inter-layer next to said first layer composed of a non-woven batt of insulating textile fibers;
   (3) a third inter-layer next to said second layer composed of an impervious synthetic polymeric film;
   (4) a fourth inside layer next to said third layer composed of a textile fabric, which layer has water repellency properties;
   said layers being stitched together by rows of stitches of synthetic textile yarns, which rows of stitches are at least horizontally disposed such that said composite is vertically foldable; and
   wherein said composite has an insulating R value of at least 3 at a total composite thickness of at least less than 0.50 inch.

22. The composite of claim 21 wherein said first layer and said fourth layer are warp knitted fabrics.

23. The composite of claim 22 wherein the yarns of the knitted fabric are polyester yarns.

24. The composite of claim 21 wherein said second layer is composed of hollow polyester fibers.

25. The composite of claim 21 wherein the third layer is a polyethylene, polypropylene, polyester or nylon film.

26. The composite of claim 25 wherein the said film is metalized on at least one surface thereof.

27. The composite of claim 21 having an additional layer composed of a non-woven batt of chemically resistant fibers disposed between said third layer and said fourth layer.

28. The composite of claim 27 wherein the fibers of said additional layer are polyester fibers.

29. The composite of claim 27 wherein the additional layer is a batt having a strength providing scrim disposed therein.

30. The composite of claim 27 where said stitches are at least in parallel rows of stitches where the distance between said rows is between 2 and 12 inches.

31. The composite of claim 30 wherein the said distance between rows of stitches is between 4 and 8 inches.

32. A weather and chemically resistant, vertically foldable, shape sustaining, multi-layered textile fabric animal holding pin window covering, comprising the composite of claim 1 configured to be disposable, in a foldable manner, next to an opened window of said pin in such a manner that the said first outer layer is on the weather side of the window and said sixth inside layer is on the pin side of the window.

* * * * *